(12) United States Patent
Koo et al.

(10) Patent No.: US 7,728,714 B2
(45) Date of Patent: Jun. 1, 2010

(54) METHOD AND APPARATUS FOR DETECTING END OF RESPONSE SIGNAL ON RADIO FREQUENCY IDENTIFICATION TAG

(75) Inventors: Ji-hun Koo, Yongin-si (KR); Woo-shik Kang, Suwon-si (KR); Jin-young Yang, Seoul (KR); Seon-wook Kim, Seoul (KR); Seok-joong Hwang, Paju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 909 days.

(21) Appl. No.: 11/522,965

(22) Filed: Sep. 19, 2006

(65) Prior Publication Data
US 2007/0120648 A1 May 31, 2007

(30) Foreign Application Priority Data
Nov. 28, 2005 (KR) .......... 10-2005-0114226

(51) Int. Cl.
*H04Q 5/22* (2006.01)

(52) U.S. Cl. ............ 340/10.4; 340/10.1
(58) Field of Classification Search ............ 340/10.1, 340/825, 10.4
See application file for complete search history.

(56) References Cited

U.S. PATENT DOCUMENTS

| 5,548,291 A * | 8/1996 | Meier et al. ............ 340/10.34 |
| 5,838,249 A * | 11/1998 | Saito et al. ............ 340/3.55 |
| 2005/0253721 A1 * | 11/2005 | Herring et al. ............ 340/572.1 |

* cited by examiner

*Primary Examiner*—Benjamin C Lee
*Assistant Examiner*—Andrew Bee
(74) *Attorney, Agent, or Firm*—Sughrue Mion, PLLC

(57) ABSTRACT

When a reader of a Radio Frequency Identification (RF-ID) system sends out a command signal to the RF-ID tag and receives a response signal from the RF-ID tag, an End of Signal (EOS) of the received response signal is detected such that the next command signal can be transmitted within a time. Accordingly, response signal can be detected even under the environment of poor signal to noise ratio performance, and the EOS of the response signal from the RF-ID tag can be recognized with ease and speed.

20 Claims, 5 Drawing Sheets

| SNR(dB) | Mean(1/LF) | Variation |
|---|---|---|
| 0 | -30.02 | 1315.5 |
| 1 | -14.385 | 881.9465 |
| 2 | -3.8125 | 311.4785 |
| 3 | -1.045 | 157.115 |
| 4 | 0.5575 | 62.0507 |
| 5 | 1.0925 | 48.7716 |
| 6 | 1.6875 | 0.1619 |
| 7 | 1.6225 | 0.1646 |
| 8 | 1.6750 | 0.1577 |
| 9 | 1.6275 | 0.1734 |
| 10 | 1.6550 | 0.1618 |
| 15 | 1.6350 | 0.1701 |
| 20 | 1.6300 | 0.1790 |

FIG. 5B
(PRIOR ART)

| SNR(dB) | Error Mean(1/LF) | Error Variation |
|---|---|---|
| 0 | -24.2096 | 133.8623 |
| 1 | -12.4975 | 225.9133 |
| 2 | 1.1725 | 48.631 |
| 3 | 3.2619 | 1.2636 |
| 4 | 3.4213 | 0.1435 |
| 5 | 3.4794 | 0.1996 |
| 6 | 3.5381 | 0.1506 |
| 7 | 3.5094 | 0.1711 |
| 8 | 3.5806 | 0.1540 |
| 9 | 3.5869 | 0.1749 |
| 10 | 3.5431 | 0.1691 |
| 15 | 3.5375 | 0.1919 |
| 20 | 3.5587 | 0.1974 |

METHOD AND APPARATUS FOR DETECTING END OF RESPONSE SIGNAL ON RADIO FREQUENCY IDENTIFICATION TAG

CROSS-REFERENCE TO RELATED APPLICATION

This application claims priority from Korean Patent Application No. 10-2005-0114226, filed Nov. 28, 2005, in the Korean Intellectual Property Office, the disclosure of which is incorporated herein by reference.

BACKGROUND OF THE INVENTION

1. Field of the Invention

Methods and apparatuses consistent with the present invention relate to detecting an end of response signal of a Radio Frequency Identification (RF-ID) tag, and more particularly, to detecting an end of response signal of an RF-ID tag, with which a reader of an RF-ID system, which sends out a command signal to the RF-ID tag, can detect an end of signal (EOS) of a response and therefore send out a next command signal in a predetermined time.

2. Description of the Related Art

Within a distance of about 1 m, a related art RF-ID technology enables wireless receiving and reading of the stored information of an RF-ID tag though a reader thereof, without requiring any physical contact.

An RF-ID tag is usually attached to a product in the form of a chip and operates as a transponder. Thus, the RF-ID tag provides information about the product from its production to purchase.

A reader usually operates as a transceiver, which wirelessly transmits and receives signals with RF-ID tag through an antenna, and thus, receives and reads the information received from the RF-ID tag.

Figure 1:
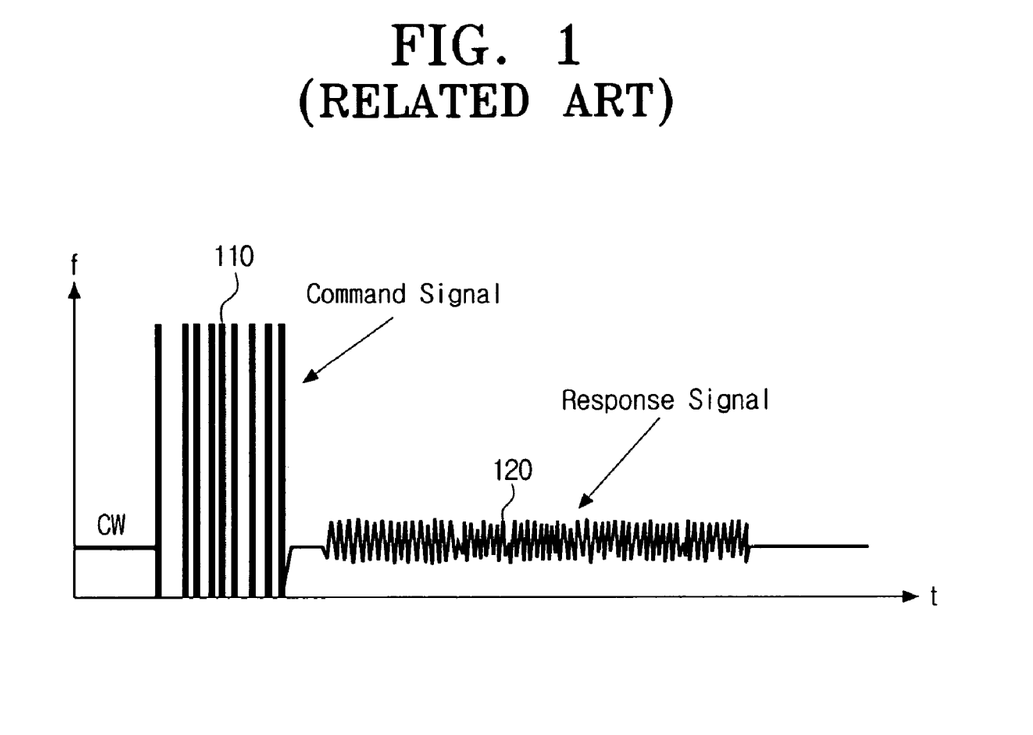
FIG. 1 is a view showing a command signal sent from a related art reader and a response signal received from an RF-ID tag.

FIG. 1 shows a command signal sent from a related art reader and a response signal received from an RF-ID tag. The related art reader sends out a command signal 110 with a continuous wave CW to an RF-ID tag, and the RF-ID tag responds with a response signal 120, using a backscattering technique, when the condition suits the received command signal.

According to the related art standards, the backscattered response signal has a fixed length and is received from the RF-ID tag within a certain fixed time after the transmission of the command signal from the reader.

However, when a related art RF-ID system supporting EPCGlabal Class-1 Generation 2 sends out command signals, it receives backscattered response signals within different times according to respective lengths of the RF-ID tags. The reader has to send out command signal to the RF-ID tag within a certain fixed time.

Accordingly, a reader has to know the end of the response signal having a shortest time to calculate the start of transmission of the next command signal.

If the response signals received from the RF-IF tag have different bit length, the End Of Signal (EOS) of the received response signals cannot be known within a short time. Further, if the EOS of the response signals is not known within a predetermined fixed time, the RF-ID tag will turn to reset status, and the reader, which fails to find out the EOS of the response signal within the time limit, takes it as a reception failure and thus repeats communication with the RF-ID tag.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and an apparatus for detecting an EOS of a response signal received from an RF-ID tag, which enables detection of EOS of response signal within a time and thus enable transmission of next command signal within a time.

According to an aspect of the present invention, there is provided a method of detecting an EOS of a response signal from an RF-ID tag which is received in response to a command signal transmitted to the RF-ID tag, the method comprising: obtaining a threshold based on a continuous wave in a section where there is no response signal; sliding a sliding window with respect to the response signal and measuring a variance value of the sliding window; comparing the variance value with the threshold and counting a number of times when the variance value is smaller than the threshold; and determining the EOS of the response signal when the number of times exceeds a value.

According to another aspect of the present invention, there is provided an apparatus for detecting an EOS of a response from a RF-ID tag, the apparatus comprising: an EOS detector which slides a sliding window with respect to a response signal received from the RF-ID tag, measures a variance value, and outputs an EOS flag if a number of times that the variance value is smaller than the threshold exceeds a value; and a controller which provides a threshold obtained based on a Continuous Wave (CW) of a section where there is no response signal from the RF-ID tag, and, if the response signal and the EOS flag have been received from the RF-ID tag, controls such that the command signal is transmitted to the RF-ID tag

BRIEF DESCRIPTION OF THE DRAWINGS

The above and other aspects of the present invention will become more apparent by describing in detail exemplary embodiments thereof with reference to the attached drawings, in which.

DESCRIPTION OF THE EXEMPLARY EMBODIMENTS

Hereinafter, exemplary embodiments of the present invention will be described in detail with reference to the drawings.

Figure 2:
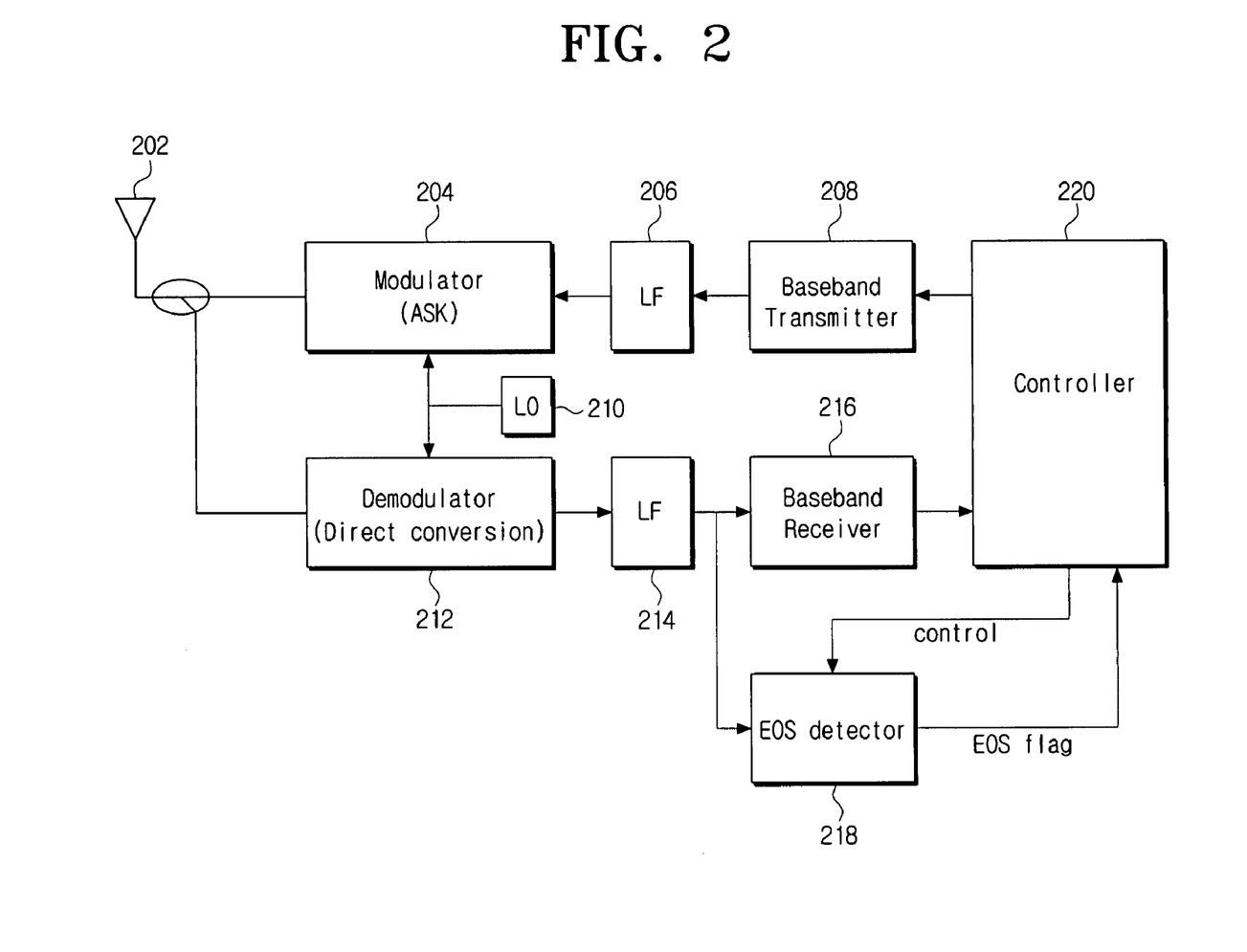
FIG. 2 is a diagram schematically showing the structure of an EOS detecting apparatus for detecting EOS of a response from an RF-ID tag according to an exemplary embodiment of the present invention.

FIG. 2 is a diagram schematically showing the structure of an end of signal (EOS) detecting apparatus detecting the EOS of a response signal from an RF-ID tag according to an exemplary embodiment of the present invention.

An EOS detecting apparatus according to an exemplary embodiment of the present invention comprises an antenna 202, a modulator 204, a low filter (LF) 206, a baseband transmitter 208, a local oscillator (LO) 210, a demodulator 212, a low filter (LF) 214, a baseband receiver 216, an EOS detector 218, and a controller 220.

The antenna 202 transmits and receives RF signals. The modulator 204 modulates data with a mechanism such as Amplitude Shift Keying (ASK). The low filter 206 filters a low frequency band. The baseband transmitter 208 transmits data for transmission to the low filter 206 at a baseband frequency. The local oscillator 210 generates a carrier frequency to send out data for transmission. The demodulator 212 demodulates the data received through the antenna 202. The low filter 214 filters the demodulated data at a low frequency band. The baseband receiver 216 transmits the received data to the controller 220 at a baseband frequency.

The EOS detector 218 slides a window over the response signal received from the RF-ID tag, and measures a variance value. Thus, the EOS detector 218 compares the variance value with the threshold, counts when the variance value is smaller than the threshold, and outputs an EOS flag to the controller 220 when the counts exceeds a value.

The controller 220 obtains a threshold based on the continuous wave of a time section that has no response signal from the RF-ID tag, and provides the obtained threshold to the EOS detector 218 so that the EOS detector 218 can compare the threshold with the variance value. When the controller 220 receives the response signal from the RF-ID tag and then receives an EOS flag from the EOS detector 218, the controller 220 controls such that the next command signal can be sent to the RF-ID tag.

Figure 3:
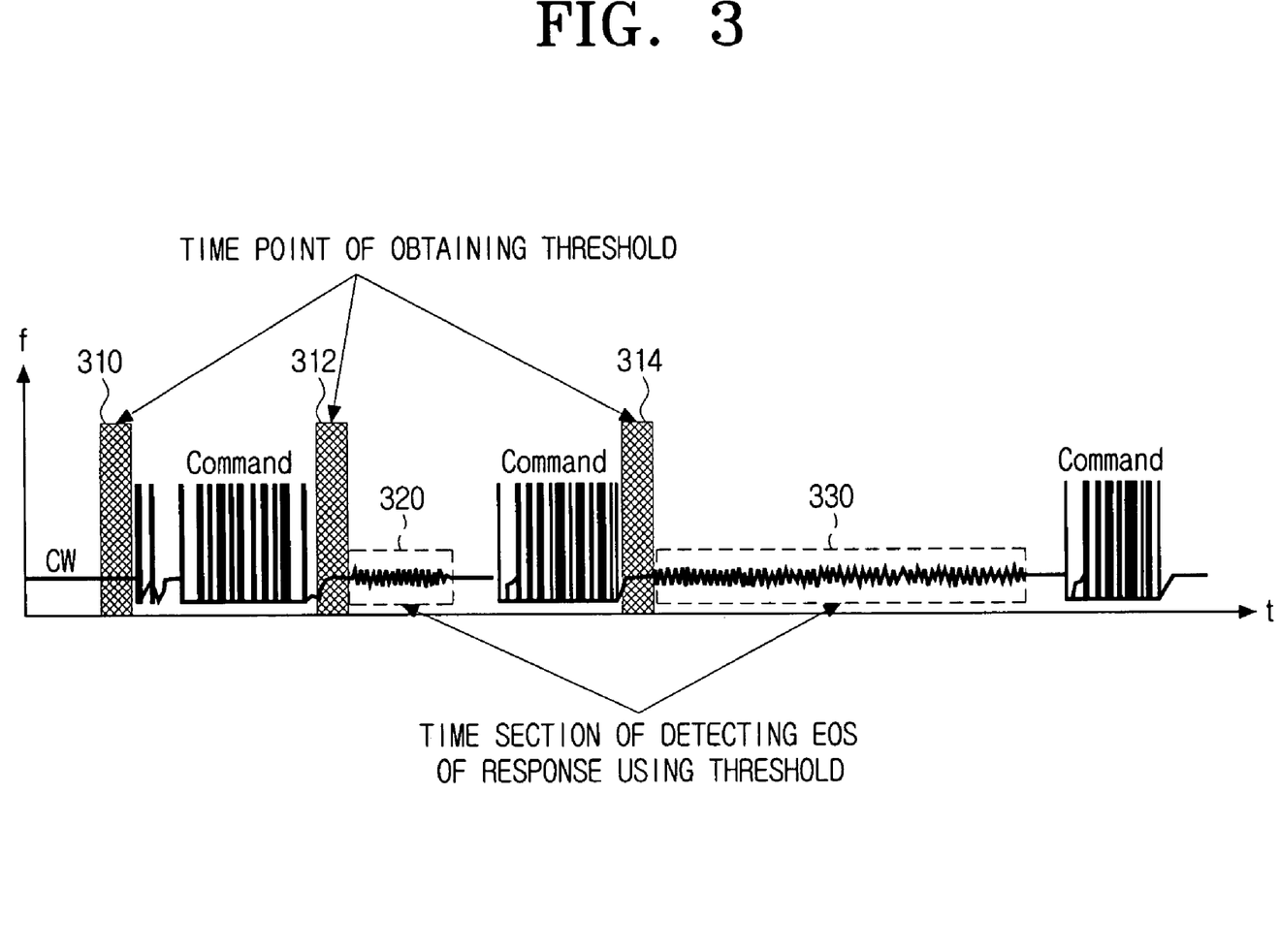
FIG. 3 is a view illustrating an EOS detecting method according to an exemplary embodiment of the present invention, particularly showing the time point that a threshold is obtained and a time section that an EOS of response signal from an RF-ID tag is obtained.

FIG. 3 is a view illustrating an EOS detecting method according to an exemplary embodiment of the present invention, particularly showing the time point that a threshold is obtained and a time section that an EOS of response signal from an RF-ID tag is obtained.

As shown in FIG. 3, the controller 220 inspects the channel environment of the time section where there is no response signal from the RF-ID tag and only the continuous wave (CW) exists, and thus obtains a threshold from a CW section 310.

Additionally, the controller 220 may obtain a threshold by inspecting the channel environment of a CW section 312 after the command signal has been transmitted to the RF-ID tag and before the response signal is received.

Additionally, when the first command signal is transmitted and a backscattered response signal 320 of a fixed length is received from the RF-ID tag within a fixed time, and when the second command signal is transmitted, the controller 220 may inspect the channel environment of a CW section 314 before the second response signal 330 is received to obtain a threshold.

The controller 220 may obtain the threshold from the CW sections 310, 312, 314 by the following mathematical expression:

$$\text{Threshold} = \frac{\alpha}{T_{Start\ of\ response} - T_{End\ of\ command}} \int_{T_{End\ of\ command}}^{T_{Start\ of\ response}} |V(t)| \cdot dt,$$

$$\alpha = \text{constant value}$$

[Mathematical expression 1]

where V(t) denotes a variance value and T1 denotes a minimum point where the response signal starts.

Accordingly, the controller 220 obtains an average of variance values of the response signal received after the transmission of the command signal until the reception of minimum T1, and obtains the threshold by using the obtained average. For example, the threshold may be a value two times as large as the average variance value.

Figure 4:
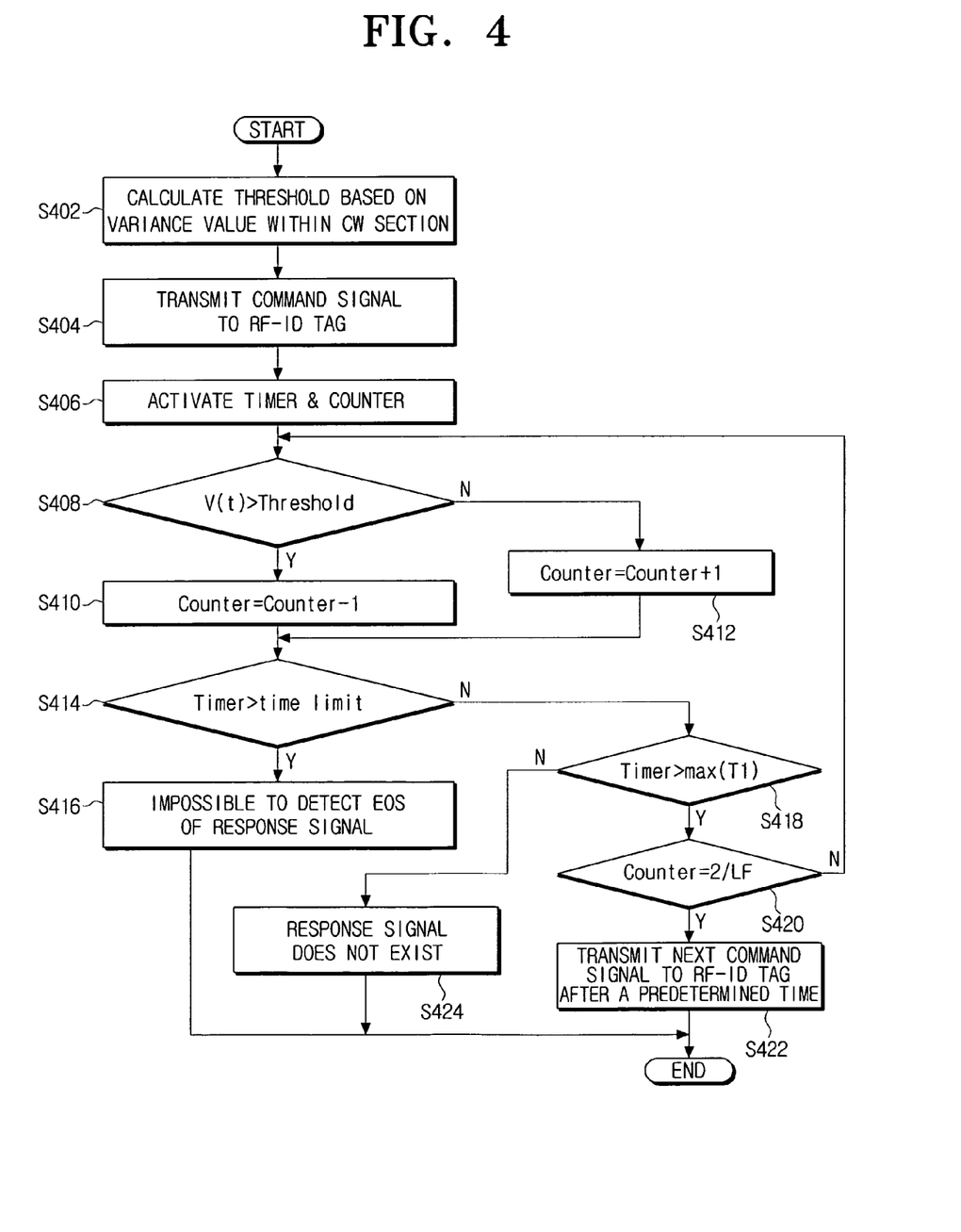
FIG. 4 is a flowchart illustrating an EOS detecting method for detecting EOS of a response signal from an RF-ID tag according to an exemplary embodiment of the present invention.

FIG. 4 is a flowchart illustrating an EOS detection method of response signal from the RF-ID tag.

First, the controller 220 calculates a threshold based on the variance values which are obtained from the CW section, where there is no response signal from the RF-ID tag (S402). The controller 220 averages the variance values, and sets the threshold value to be at least twice as large as the average of the variance values.

Next, the controller 220 transmits the calculated threshold to the EOS detector 218, and transmits a command signal to the RF-ID tag (S404).

After the controller 220 transmits the command signal to the RF-ID tag, the controller 220 operates a timer and counter (S406). The timer and counter may be included in the controller 220, or the controller 220 may have the function of the timer and counter.

Meanwhile, when a response signal is received from the RF-ID tag, the EOS detector 218 slides the sliding window with respect to the received response signal, thus measuring the variance values of each sliding window. The sliding windows are used to measure the variance values and are at predetermined time intervals.

The variance value is obtained by the following mathematical expression:

$$V(T) = \frac{1}{2/F} \int_{T-2/LF}^{T} |r(t) - \overline{r(T)}|^2 \cdot dt$$

[Mathematical expression 2]

$$\overline{r(T)} = \frac{1}{2/LF} \int_{T-2/LF}^{T} r(t) \cdot dt$$

where LF denotes a link frequency form the tag to the reader.

The EOS detector 218 measures variance values, while extending a next value of the sliding window to be twice its current value. Next, the EOS detector 218 compares the variance value as obtained with the threshold (S408), and increments '1' when the variance value is smaller than the threshold value. When the variance value is larger than the threshold value, the counter decrements '1' (S410), and when the variance value is equal to or smaller than the threshold, the counter increments '1' (S412).

The EOS detector 218 compares whether the time counted by the timer is longer than a time limit (S414). If the counted time is longer than the time limit, the EOS detector transmits to the controller 220 an indication that it is impossible to detect the EOS of the response signal (S416). The 'time limit' refers to the time duration from when there is a response from the RF-ID tag until when there are a maximum number of response signals.

Meanwhile, when the counted time is within the time limit, the EOS detector 218 determines whether the counted time is longer than the time max (T1), which is the time that the response signal exists (S418). If the counted time is longer than max (T1), the EOS detector 218 transmits to the controller 220 that there is no response signal (S424).

Next, the EOS detector 218 checks whether the counts obtained by the counter reach a reference value (2/LF) (S420). As disclosed above, the counts refer to the number of times when the variance value within the response signal is smaller than the threshold. The reference value is twice as long as the link frequency time.

Accordingly, when the number of times that the variance value within the sliding window of response signal section is smaller the threshold exceeds a reference value, the EOS detector 218 determines it as the EOS and thus transmits an EOS flag to the controller 220.

When the controller 220 receives EOS flag from the EOS detector 218, the controller 220 transmits the next command signal to the RF-ID tag at a time interval (S422). For example but not by way of limitation, the time interval may be predetermined, but is not limited thereto.

Figure 5A:
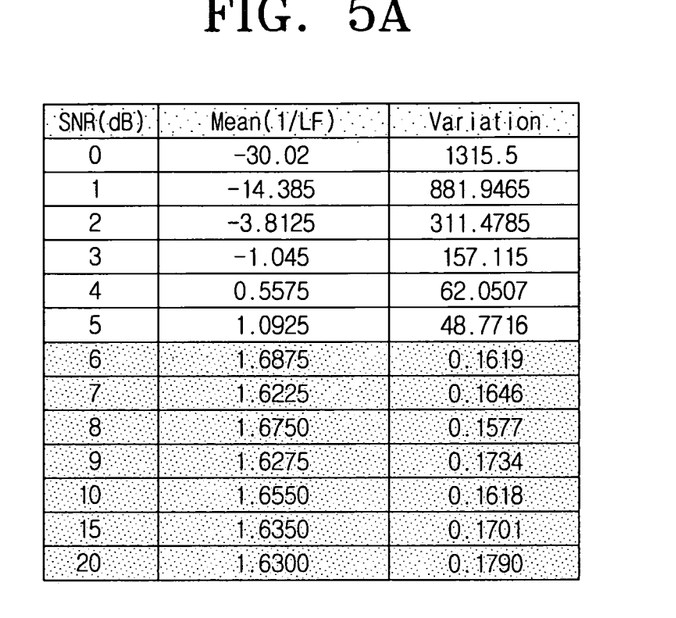
FIG. 5A shows a table listing the results according to the related art.
Figure 5B:
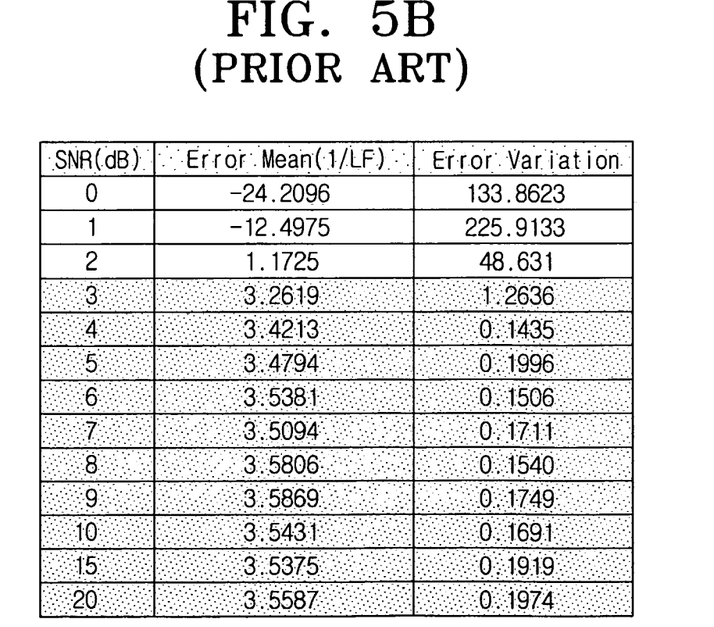
FIG. 5B shows a table listing the results according to the related art coding rule.

With respect to the performance according to the signal to noise ratio (SNR) of the response signal, the EOS detection method according to the present invention and EOS detection with conventional coding rule respectively have different results as shown in the tables of FIGS. 5A and 5B.

FIG. 5A shows a table listing the results according to the related art and FIG. 5B shows a table listing the results according to the related art coding rule. According to the related art shown in FIG. 5B, the EOS of response signal can be detected until the SNR performance is 6 dB. However, according to the EOS detection of the exemplary embodiment of the present invention shown in FIG. 5A, the EOS of response signal is detectable even in a poor SNR performance such as 3 dB. Because response signal is detectable even under the poor SNR environment, the efficiency of RF-ID tag recognition increases.

Additionally, the foregoing methods of the exemplary embodiments may be implemented in a computer readable medium, or a data carrier. More specifically, the computer-readable medium includes a set of instructions (e.g., computer program). The instructions include the operations discussed with respect to the foregoing methods. As a result, the present invention can be implemented as software, in addition to the foregoing disclosure.

As described above with referring to the exemplary embodiments, a response signal can be detected even under the environment of poor SNR performance, and the EOS of the response signal from RF-ID tag can be recognized with ease and within short time. Because EOS of response signal can be recognized quickly, reattempt to recognize RF-ID tag can be substantially avoided.

The above description is illustrative and not restrictive. Many variations of the exemplary embodiments will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of detecting an End of Signal (EOS) of a response signal from a Radio Frequency Identification (RF-ID) tag which is received in response to a first command signal transmitted to the RF-ID tag, to enable transmission of a next command signal by an RF-ID reader within a predetermined period of time, the method comprising:

obtaining, by the RF-ID reader, a threshold based on a continuous wave signal generated by the RF-ID reader in a first time section where there is no response signal;

sliding, by an RF-ID reader, a sliding window in a second time section where the response signal is received and measuring a variance value of the sliding window;

comparing, by the RF-ID reader, the variance value within the sliding window with the threshold and counting a number of times that the variance value is smaller than the threshold; and determining, by the RF-ID reader, the EOS of the response signal if the number of times exceeds a predetermined value;

wherein the first time section is a time section between the transmission of the first command signal and the reception of the response signal, wherein the sliding window is a window at a predetermined time interval to measure the variance value, and wherein the variance value is a variance regarding a frequency of the response signal.

2. The method of claim 1, further comprising, after the obtaining the threshold, transmitting the first command signal to the RF-ID tag, and operating a timer for counting a response time of the response signal.

3. The method of claim 2, further comprising, if the response time exceeds an upper time limit, determining that the response signal exists and that detecting the EOS of the response signal is impossible.

4. The method of claim 2, further comprising, if a result of the timer exceeds a time and the number of times exceeds a value, determining that the response signal does not exist.

5. The method of claim 1, further comprising obtaining the variance value based on:

$$V(T) = \frac{1}{2/F} \int_{T-2/LF}^{T} |r(t) - \overline{r(T)}|^2 \cdot dt$$

and $$\overline{r(T)} = \frac{1}{2/LF} \int_{T-2/LF}^{T} r(t) \cdot dt$$

where LF denotes a link frequency from the tag to the reader, wherein V(T) denotes the variance value, F denotes a frequency, T denotes a time, and r(t) denotes the frequency of the response signal.

6. The method of claim 1, comprising obtaining, by the RF-ID reader, the threshold based on:

$$\text{Threshold} = \frac{\alpha}{T_{Start\ of\ response} - T_{End\ of\ command}} \int_{T_{End\ of\ command}}^{T_{Start\ of\ response}} |V(t)| \cdot dt,$$

$\alpha$ = constant value where V(t) denotes the variance value, T Start of response denotes a time point at which the reception of the response signal is staffed, and T End of command denotes a time point at which the transmission of the first command signal is ended.

7. The method of claim 1, wherein in the obtaining the threshold, the variance value is obtained from the continuous wave (CW) signal in the first time section, the variance value is averaged, and a value as twice as large as an average of the variance is set to be the threshold.

8. The method of claim 1, wherein the sliding window is at a time interval to measure the variance value.

9. An apparatus for detecting an End of Signal (EOS) of a response from a Radio Frequency Identification (RF-ID) tag responsive to a first command signal from an RF-ID reader to enable transmission of a next command signal within a predetermined time period, the apparatus comprising:

an EOS detector which slides a sliding window in a second time section where the response signal is received from the RF-ID tag, measures a variance value within the sliding window, and outputs an EOS flag if a number of times that the variance value is smaller than a threshold exceeds a predetermined value; and a controller which provides a threshold obtained based on a Continuous Wave (CW) signal generated by the RF-ID reader in a first time section where there is no response signal from the RF-ID tag, and, if the response signal and the EOS flag have been received from the RF-ID tag, controls such that the next command signal is transmitted to the RF-ID tag, wherein the first time section is a time section between the transmission of the first command signal and the reception of the response signal, wherein the sliding window is a window at a predetermined time interval to measure the variance value, and wherein the variance value is a variance regarding a frequency of the response signal.

10. The apparatus of claim 9, wherein the controller transmits the first command signal to the RF-ID tag and operates a timer that counts the response time of the response signal.

11. The apparatus of claim 9, wherein if the response time of the response signal exceeds an upper time limit, the EOS detector determines that the response signal exists and that the EOS of the response signal cannot be detected.

12. The apparatus of claim 10, wherein if the result of the timer exceeds a time and the number of counts exceeds a value, the EOS detector transmits to the controller that the response signal does not exist.

13. The apparatus of claim 9, wherein the controller obtains the variance value from the CW section, averages the variance value, and sets a value as twice the average of the variance to be the threshold.

14. The apparatus of claim 9, wherein the variance value is based on:

$$V(T) = \frac{1}{2/F} \int_{T-2/LF}^{T} |r(t) - \overline{r(T)}|^2 \cdot dt$$

and $$\overline{r(T)} = \frac{1}{2/LF} \int_{T-2/LF}^{T} r(t) \cdot dt$$

where LF denotes a link frequency from the tag to the reader, wherein V(T) denotes the variance value, F denotes a frequency, T denotes a time, and r(t) denotes the frequency of the response signal.

15. The apparatus of claim 9, wherein the threshold is based on:

$$\text{Threshold} = \frac{\alpha}{T_{Start\ of\ response} - T_{End\ of\ command}} \int_{T_{End\ of\ command}}^{T_{Start\ of\ response}} |V(t)| \cdot dt,$$

$$\alpha = \text{constant value}$$

where V(t) denotes the variance value, T Start of response denotes a time point at which the reception of the response signal is staffed, and T End of command denotes a time point at which the transmission of the first command signal is ended.

16. A computer-readable medium storing program for executing a method for detecting an End of Signal (EOS) of a response signal from an Radio Frequency Identification (RF-ID) tag which is received in response to a first command signal transmitted from an RF-ID reader to the RF-ID tag to enable transmission of a next command signal within a predetermined time period, the method comprising:

obtaining a threshold based on a continuous wave signal generated by the RF-ID reader in a first time section where there is no response signal;

sliding a sliding window in a second time section where the response signal is received and measuring a variance value of the sliding window;

comparing the variance value within the sliding window with the threshold and counting a number of times that the variance value is smaller than the threshold; and determining the EOS of the response signal if the number of times exceeds a predetermined value;

wherein the first time section is a time section between the transmission of the first command signal and the reception of the response signal, wherein the sliding window is a window at a predetermined time interval to measure the variance value, and wherein the variance value is a variance regarding a frequency of the response signal.

17. The computer readable medium of claim 16, wherein the method further comprises obtaining the variance value based on:

$$V(T) = \frac{1}{2/F} \int_{T-2/LF}^{T} |r(t) - \overline{r(T)}|^2 \cdot dt$$

and $$\overline{r(T)} = \frac{1}{2/LF} \int_{T-2/LF}^{T} r(t) \cdot dt$$

where LF denotes a link frequency from the tag to the reader, wherein V(T) denotes the variance value, F denotes a frequency, T denotes a time, and r(t) denotes the frequency of the response signal.

18. The computer readable medium of claim 16, wherein the threshold is based on:

$$\text{Threshold} = \frac{\alpha}{T_{Start\ of\ response} - T_{End\ of\ command}} \int_{T_{End\ of\ command}}^{T_{Start\ of\ response}} |V(t)| \cdot dt,$$

$$\alpha = \text{constant value}$$

where V(t) denotes the variance value, T Start of response denotes a time point at which the reception of the response signal is staffed, and T End of command denotes a time point at which the transmission of the first command signal is ended.

19. The computer readable medium of claim 16, wherein the method further comprises, after the obtaining the threshold, transmitting the first command signal to the RF-ID tag, and operating a timer for counting a response time of the response signal.

20. The computer readable medium of claim 19, wherein the method further comprises, if the response time exceeds an upper time limit, determining that the response signal exists and that detecting the EOS of the response signal is impossible, and if a result of the timer exceeds a time and the number of times exceeds a value, determining that the response signal does not exist.

* * * * *